United States Patent [19]

Fukuoka et al.

[11] Patent Number: 4,878,768

[45] Date of Patent: Nov. 7, 1989

[54] BEARING HAVING AN IMPROVED CORROSION-RESISTANCE

[75] Inventors: Tatsuhiko Fukuoka; Takashi Suzuki, both of Toyota, Japan

[73] Assignee: Taiho Kogyo, Ltd., Aichi, Japan

[21] Appl. No.: 228,092

[22] Filed: Aug. 4, 1988

[30] Foreign Application Priority Data

Feb. 13, 1987 [JP] Japan ................................. 62-029807

[51] Int. Cl.$^4$ .............................................. F16C 33/12
[52] U.S. Cl. .................................... 384/279; 384/625; 384/912
[58] Field of Search ............... 384/276, 625, 912, 913, 384/279, 280

[56] References Cited

FOREIGN PATENT DOCUMENTS

| 3922498 | 10/1964 | Japan . |
| 463654 | 1/1971 | Japan . |
| 989946 | 4/1965 | United Kingdom . |
| 1117684 | 6/1968 | United Kingdom . |

Primary Examiner—Lenard A. Footland
Attorney, Agent, or Firm—Armstrong, Nikaido Marmelstein, Kubovcik & Murray

[57] ABSTRACT

Disclosed is a bearing having an improved corrosion resistance, which comprises: a base metal; and, a bearing layer of Cu-series alloy having a skeleton structure of Cu alloy. The clearance of the skeleton structure are filled essentially with Pb-containing phase. The deterioration of corrosion resistance due to dissolution of Pb in the clearances into degraded engine oil is prevented by including into the Pb-containing phase In at a depth exceeding approximately 20 μm mearued from the surface of the bearing layer.

11 Claims, 12 Drawing Sheets

Fig. 12
Fig. 13
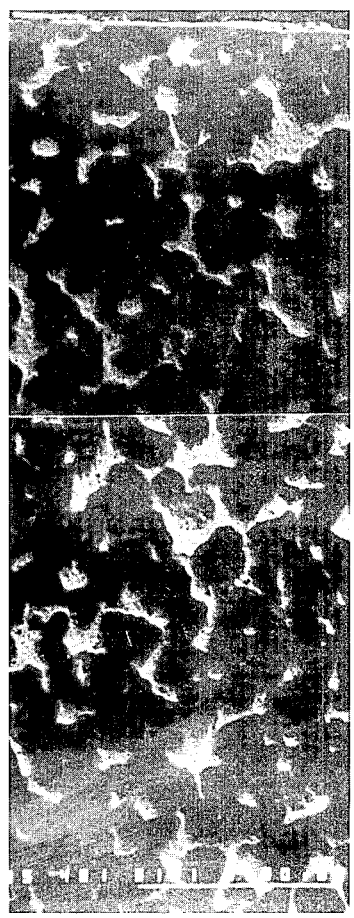
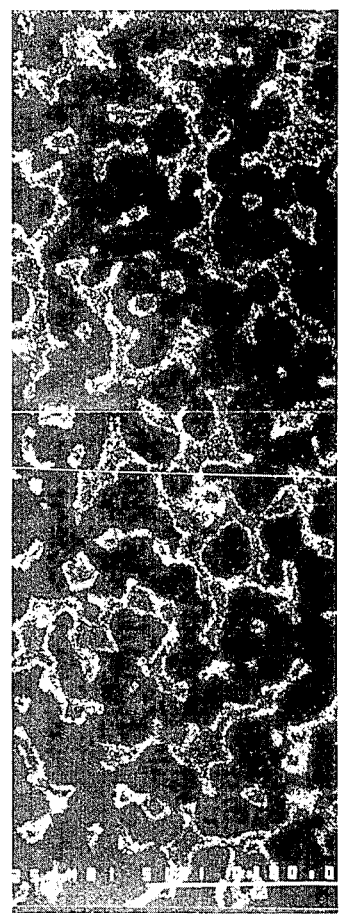

BEARING HAVING AN IMPROVED CORROSION-RESISTANCE

BACKGROUND OF INVENTION

1. Field of Invention

The present invention relates to a bearing, particularly a Cu-Pb series bearing, and a method for producing the same.

2. Description of Related Arts.

In Japanese Examined Patent Publication No. 39-22498, there is a proposal for producing an In-containing Cu-Pb series kelmet bearing. According to this proposal, rolled steel is subjected to coating of molten Cu to prepare a long strip-form substrate having a surface layer of Cu alloy. This Cu plating layer is subjected to plating of molten Pb-In alloy. The so obtained bearing has a Cu alloy layer, an intermediate Cu-In alloy layer formed due to diffusion of In into the Cu alloy, and a solidified layer of Pb-In pool.

It is known from Japanese Examined Patent Publication No. 46-3654 to include Te besides In into the Cu-Pb series kelmet bearing.

The other method employed for producing the kelmet bearing than the method described above is a sintering method. In the sintering method, Cu-Pb powdered alloy or Cu metal powder and Pb metal powder are dispersed on a hoop used as the substrate, and the hoop is passed through a sintering furnace and heated. The bimetal bearing is thus obtained. There is also a combined, sintering and hot-dip method, in which the bimetal bearing obtained by the sintering method is passed through a Pb-Sn bath to replace the Pb of bimetal with Sn in the bath.

The kelmet bearing is provided with a soft alloy, such as Pb-In alloy on the kelmet alloy-layer via a Ni barrier, except cases where the kelmet bearing is used under a low load.

Recently, bearing troubles arose in Diesel automobiles using sintered alloy-series kelmet bearings, when the running distance amounted to 100,000 km to 150,000 km. The present inventors investigated the bearings which caused trouble and confirmed the following. That is, in such bearings, the overlay was locally scratched off, although this local scratching did not lead to seizure. Occasionally, local corrosion or wear of overlay occurred to partly expose the kelmet, and Pb of the kelmet was removed from an inner part of the overlay through the exposed surface of the kelmet. Also, occasionally, cracks were generated in the overlay, and Pb was dissolved and flowed out through the cracks, thereby causing the disappearance of Pb from inner part of kelmet. The present inventors compared the Pb-disappearance degree and situation with the troubles of bearing and then could determine casual relations between them. In addition to the investigation of the bearings used in actual engines, the present inventors carried out investigation to reproduce in the laboratory the Pb disappearance from the kelmet surface and to compare the Pb-disappearance degree and situation with the performances of bearings. The conclusion arrived as a result of the investigations was that, in order to ensure the performances of bearings of Diesel engines for a long running period as described above, the Pb disappearance needs to be prevented or suppressed.

The above described trouble of bearings do not occur in gasoline engines during a long distance running. It is however anticipated that similar trouble may occur even at a short running distance, when the power and rotation of gasoline engines are enhanced. The countermeasure against the Pb disappearance seems therefore to be useful for any troubles of bearings used in gasoline engines. The situation of Pb disappearance is described in more detail with reference to FIG. 2.

BRIEF DESCRIPTION OF DRAWINGS

FIG. 12 is a photograph showing a cross sectional SEM image of a test sample according to the present invention, before the corrosion test.

FIG. 13 is a photograph showing an EPMA image under the same state as in FIG. 12.

Referring to FIG. 2, the structure of sintered alloy-series kelmet bearing is schematically illustrated. Reference numeral 1 denotes the kelmet-alloy layer which may be occasionally referred to as the lining. 2 denotes the overlay, and 10 denotes the substrate. An Ni-plating barrier is formed between the kelmet-alloy layer and the substrate 10 but is omitted from the drawing. The structure of kelmet-alloy layer is a peculiar one of the sintered body. More specifically, the particles of Cu alloy are bonded to form a three dimensional structure which is usually referred to as the skeleton 3. The clearances 4 surrounded by the skeleton 3 form the pores in the ordinary sintered body. Since the Cu alloy sintered body of the kelmet contains a low-melting point metal, i.e., Pb, it or its alloy permeate into almost all of the clearances 4 and fill them. Therefore, such segregation is seen in the sintered kelmet that the Cu and Pb components are enriched in the skeleton 3 and clearances 4, respectively.

Figure 1A:
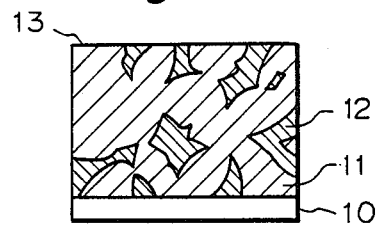
FIGS. 1A through 1D illustrates the dip method according to the present invention.
Figure 1B:
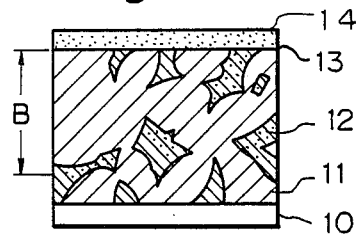

The Pb is removed from the kelmet-alloy layer 1 which is exposed through the scratched parts of overlay 2. The Pb outside the skeleton 3 and within clearances 4 is removed from the kelmet-alloy layer 1. The reason for Pb disappearance is not mechanical such that the Pb phase is mechanically worn out but is chemical such that corrosive liquid enters the deep part of the skeleton 3 and clearances 4 and dissolves the Pb layer.

The present inventors produced by casting Cu-alloy on a base plate kelmet bearings having the skeleton strucutre, reproduced in laboratory with regard to these kelmet bearings the circumstances of long-distance running, and confirmed also the dissolution of Pb. It turned out therefore that the Pb disappearance cannot be prevented by the coating structure of the kelmet.

Engine oil is degraded due to use for a long running time and causes a preferential corrosion of Pb (the Pb phase present in the clearances 4) as compared with Cu alloy (the constituent Cu phase of skeleton 3). The degraded engine oil therefore acts as corrosive liquid. This is a major reason for the Pb disappearance.

SUMMARY OF THE INVENTION

It is an object of the present invention to provide a kelmet bearing having an improved corrosion resistance.

It is another object of the present invention to provide a method for producing a kelmet bearing having an improved corrosion resistance.

The present inventors discovered that addition of In into the Pb phase present in clearances 4 and situated outside the skeleton 3 is effective for improving the corrosion resistance and for suppressing the Pb disappearance, and, further that comprehensive performances of bearing are not at all impaired by the local addition of In.

In accordance with the objects of the present invention, there is provided a bearing comprising; a base plate; and, a bearing layer of Cu-series alloy which has the first surface facing the base plate and the second surface opposite to the first surface and which consists essentially of a Cu-alloy phase forming a skeleton structure extending between the first and second surfaces, and a Pb-containing phase filling essentially the clearances of the skeleton structure, wherein at least a part of said Pb-containing phase including the second surface contains In until a depth exceeding approximately 20 μm measured from the second surface.

DESCRIPTIONS OF PREFERRED EMBODIMENTS

The present invention can be applied to all of the Cu-Pb series alloy bearing having the skeleton structure mentioned above and clearances where Pb-containing phase is present and causes the deterioration of corrosion resistance. The Cu and Pb contents of Cu-Pb series alloy are preferably such that the quantity of Cu phase is from 50 to 86%, the balance being Pb. Outside this composition, the bearing becomes impractical. The Cu-Pb series alloy can contain third element(s), such as Sn, Ni, Sb, Al, Fe, Mn, Zn, and P. Sn, Sb, Zn, and Al are mainly dissolved in the solid solution of Cu phase to improve its corrosion resistance and strength. Ni, Fe, Mn, and P improve the strength of the Cu-series alloy. These thirds elements may be partly included in the Pb-containing phase but virtually do not improve its corrosion resistance against the degraded oil. That is, the function of In to improve the corrosion resistance of Pb-containing layer is special. This function of In is not realized by other additive elements as Sn, Ni, Sb, Al, Fe, Mn, Zn, P, and the like of kelmet alloys. Incidentally, In can be added to the constituent elements of Cu-alloy phase, such as the binary Cu-Pb phase or the ternary Cu-Pb-Sn phase. In this case, In is absorbed in the Cu-alloy phase and hence virtually does not exert influence upon the corrosion resistance of Pb-containing phase against the degraded oil.

Sn is the most preferred among the above described additive elements of the Cu-alloy phase. Ni, Sb, Zn and P are the second preferred. Preferred additional quantity of these elements to the Cu phase is: 0.1–20% of Sn; 5% or less of each of Ni, Sb, Fe and Mn, and 10% or less of sum of these elements; 0.1—60% of Zn; and, 0.01—0.5% of P.

Preferred additional quantity of In to the Pb-containing phase is 40% or less. Preferred addition quantity of Sb, Bi, and T1 is 10% or less in a case of adding each element alone and 20% or less in total in a case of adding two or more elements. Preferred additional quantity of Ca is 2% or less.

The above described additional quantity of Cu, Pb, Sn, In and the like is not based on the total of bearing but on the respective phase of Cu-series alloy bearing layer. In can be contained in both the Pb-containing phase and Cu phase. It is important to control the additional quantity of In in the Pb-containing phase. When the third element is added in a quantity exceeding the above mentioned values, disadvantages such as embrittlement of Cu phase and excessive softening of Pb-containing phase arise. Change in the properties of kelmet alloy due to additive is known and is not the feature of present invention, and hence is not described further in detail.

It is extremely difficult by means of controlling the parameters of sintering method to selectively add In into the Pb-containing phase in the surface part of the bearing layer at a depth exceeding approximately 20 μm from the surface. When a Cu-Pb-In alloy is directly subjected to the sintering, In is essentially absorbed in the skeleton consisting of Cu alloy, no matter how the temperature, cooling and the like are controlled. In addition, when Cu-Pb sintered alloy is subjected to plating of molten Pb-In alloy, In is included into the Pb-containing phase only at the outermost surface of Cu-Pb alloy. The present inventors carried out various experiments for intruding In into the clearances between the skeleton of Cu-Pb sintered alloys which occasionally contained third element(s) and discovered the hot-dip method of sintered alloy into the Pb-In bath to be most desirable. According to this method, In permeates through the Pb-containing layer deeply into the interior of skeleton. In fills the vacant spaces left somewhat in the clearances of skeleton or passes through the vacant spaces and then permeate into the Pb-containing phase. Although In permeates deeply into the sintered alloy, In virtually does not permeate into the Cu-Pb alloy phase forming the skeleton.

Figure 3:
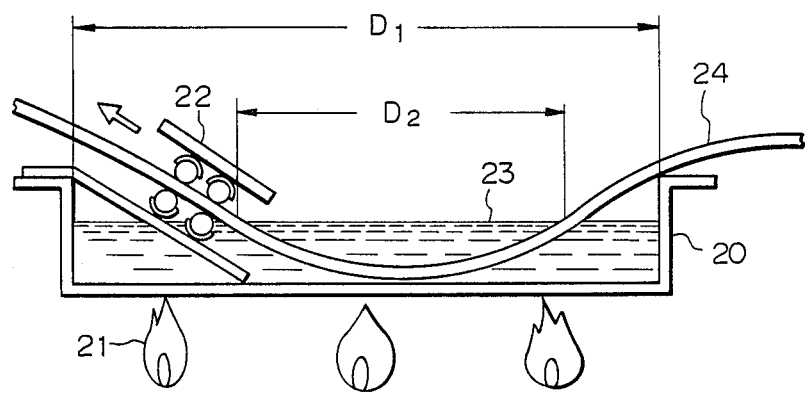
FIG. 3 is a cross sectional view of dip tank.

Referring to FIG. 3, a dipping apparatus for adding In into the Pb-containig phase is schematically illustrated. A strip 24 consisting of bimetal of base plate and lining is subjected to surface-cleaning and is then guided into the Pb-In bath contained in the iron tank 20 having length ($D_1$) of 1 m. The strip 24 then leaves the iron tank 20 and is passed through wiper 22 for wiping off excessive Pb-In. The strip 24 is conveyed into direction shown by arrow, cooled, and shaped into the form of a bearing. The Pb-In bath 23 is maintained at molten state by flames 21 of burners. The Pb content of Pb-In bath used for the hexperiments was 90%. Temperature was 350° C. The immersion length ($D_2$) of strip in the Pb-In bath 23 was kept constant at approximately 60 cm. After dipping, heating was carried out at 155° C. for 1 hour to stabilize the structure. The kelmets tested were prepared by the above described impregnation method. The kelmets were Cu-24% Pb alloy, unless otherwise specified. The kelmets used for the comparison tests with the impregnated bearings were also made of Cu-24% Pb alloy.

A. Corrosion test by degraded engine oil (1) Tested materials
(a) Comparative material 1: Cu-series alloy (Cu-24%Pb-3%Sn kelmet alloy. Conventional kelmet bearing)
(b) Comparative material 2: Cu-series alloy (Cu-23%Pb-1.5%Sn cast alloy. On this alloy a 14 μm thick overlay of Pb-In alloy was plated. Then, heating was carried out at 180° C. for 100 hours to diffuse In into the Pb phase of Cu alloy. The cutting removal was then carried out by broaching to remove the overlay by 14 μm and the lining by 14 μm. 28 μm was thus removed in total.)
(c) Comparative material 3: the same as Comparative material 2. However, the cutting removal was changed such that only the overlay was removed by a knife to expose the lining.

The comparative materials 2 and 3 are those for investigating influence of permeation depth of In in the clearances of skeleton.

(d) Invention Cu-24%Pb-3%Sn sintered alloykelmet. In was included in the Pb-containing phase by the inventive hot-dip method. The Pb phase contained 8% of In.

(2) Testing Method

Degraded oil (engine oil of Diesel engine, which was not replaced during running of 100,00–150,00 km) was heated, and the test materials were immersed in it for 400 hours. The weight-reduction due to corrosion was then measured and divided by the area of Pb on the surface of bearings which amounted to approximately 20% by area of the bearing surface. The obtained value is indicated as the corrosion weight-loss.

Figure 4:
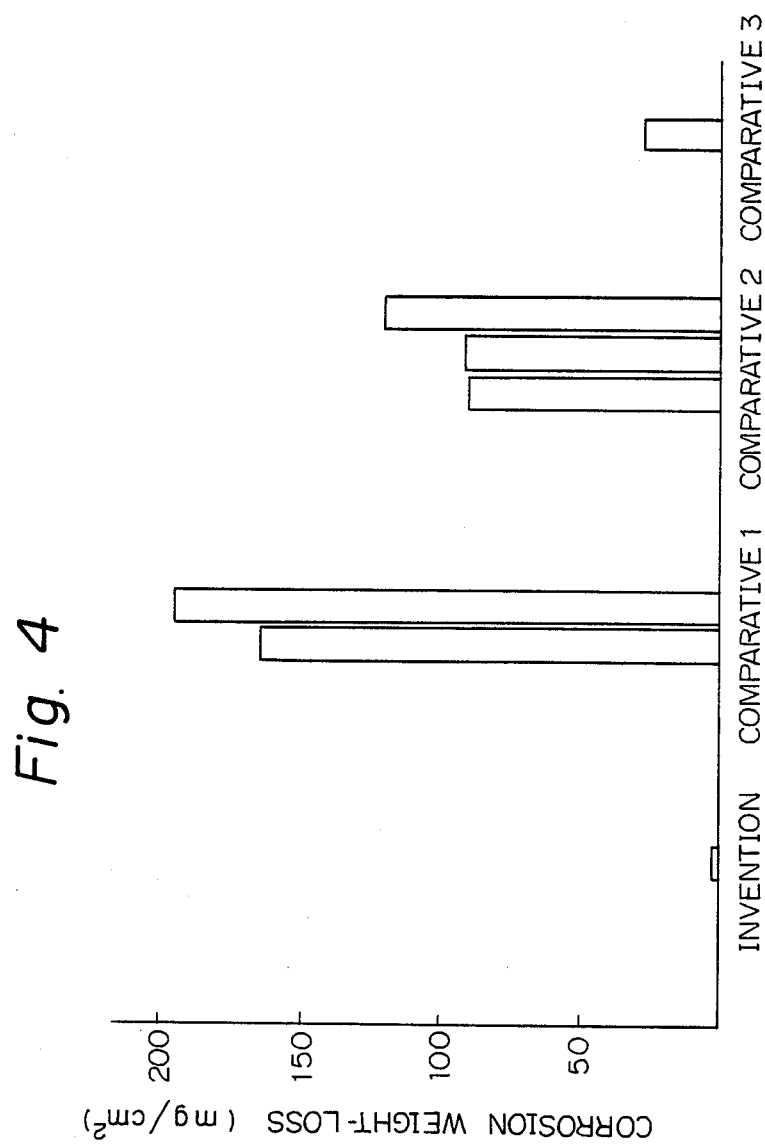
FIG. 4 is a graph of corrosion weight-loss.
Figure 5:
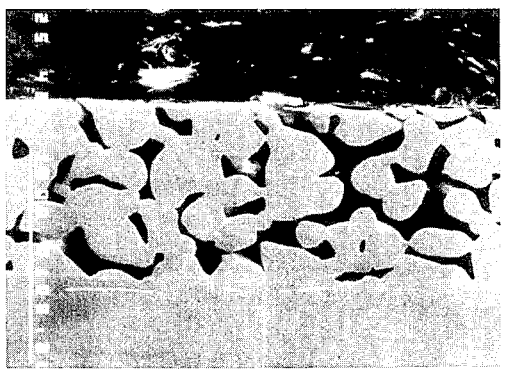
FIG. 5 is a photograph showing the skeleton and clearances between the skeleton.

The test samples were observed by an optical microscope, SEM, and EPMA. The results are shown in FIG. 4. The comparative material 1. i.e., the kelmet bearing, exhibits the worst corrosion resistance against the degraded oil. Referring to FIG. 5, the optical microscope structure (magnification ×400) of the sample, which has been subjected to the corrosion test by degraded oil, is shown at its cross section. It is clear from this photograph that the Pb-containing phase is dissolved out from the space between the skeleton and then complete vacancies are left in the space where the Pb-containing phase is dissolved.

The corrosion of comprative material 2 (In is included in the Pb-containing phase only at the outermost part of bearing) corresponds to actual corrosion of bearing, in which the lining surface is exposed after long distance running, and then the outermost (approximately 10 μm thick) In-containing part of Pb-containing phase disappears as a result of wear and corrosion, with the result that the Pb-containing phase essentially free of In appears. Meanwhile, the corrosion of comparative material 3 corresponds to the one, in which the outermost surface of the lining is exposed and the Pb-containing phase with the In additive appears.

Figure 8:
FIG. 8 is photograph showing an SEM image of the surface of lining described with reference to FIG. 6.
Figure 9:
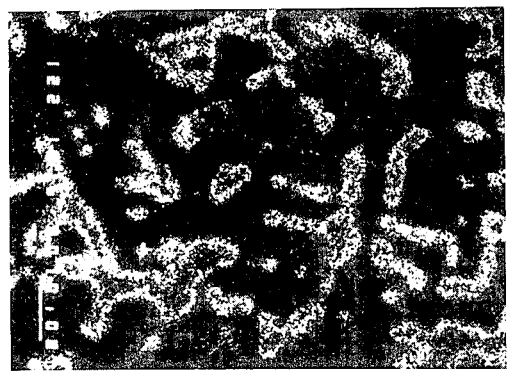
FIG. 9 is a photograph showing an EPMA image of In of the surface of lining described with reference to FIG. 6.
Figure 10:
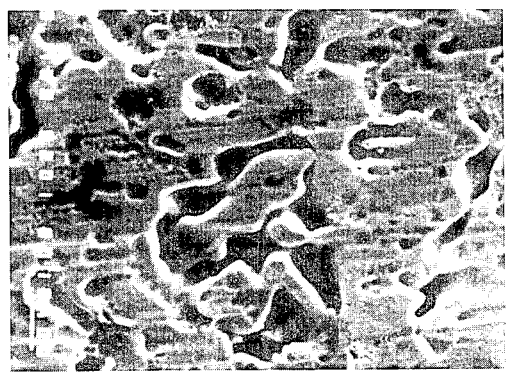
FIG. 10 is a photograph showing a cross sectional SEM image of the lining which has been subjected to corrosion test.
Figure 11:
FIG. 11 is a photograph showing an EPMA image of In on the cross section described with reference to FIG. 10.
Figure 14:
FIG. 14 is a photograph showing an SEM image prior to the corrosion test.
Figure 15:
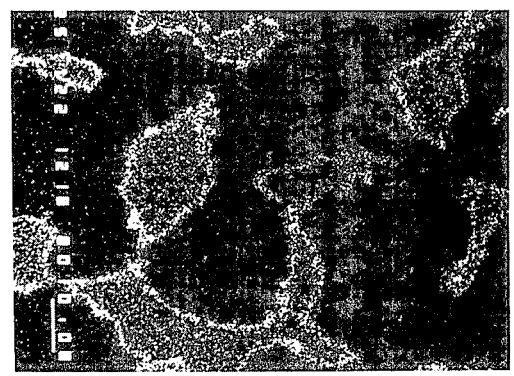
FIG. 15 is a photograph showing an EPMA image of In after the corrosion test.
Figure 16:
FIG. 16 is a photograph showing an SEM image prior to the corrosion test.
Figure 17:
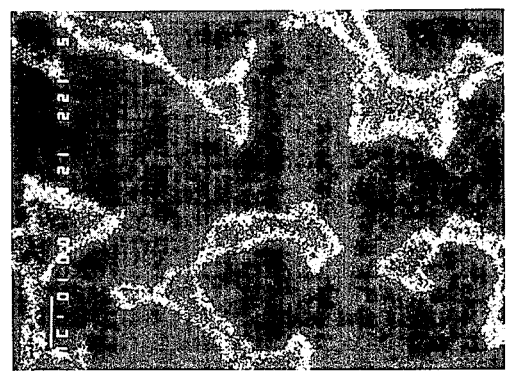
FIG. 17 is a photograph showing an EPMA image of In after the corrosion test.

Incidentally, the specific weight of Pb-In alloy is approximately 10 (Pb=11.3, In=7.3). The area ratio of Pb phase at the bearing surface of sintered Cu alloy is approximately 20% (c.f. FIG. 8). Accordingly, when the corrosion of approximately 6 mg/cm$^2$ occurs (the comparative material 3 of FIG. 4), the corrosion weight-loss of Pb phase is approximately 30 mg/cm$^2$. When this value is divided by the specific gravity to obtain the depth of Pb alloy lost by corrosion, 3 mm$^3$/cm$^2$, i.e., approximately 30 μm, is obtained.

The cutting removal of lining by 14 μm in the comparative material 2 corresponds to the weight loss per area of approximately 15 mg/cm$^2$ with regard to the Pb phase. The corrosion quantity of comparative material 2 of FIG. 4 corresponds to the corrosion that the comparative material 3 corrodes by approximately 15 mg/cm$^2$ and then by approximately 100 mg/cm$^2$. In other words, the corrosion test of comparative material 2 corresponds to the corrosion test of comparative material 3, as if it were subjected to corrosion test for 600 hours. The temperature of oil used for testing was higher than 100° C. and lower than the flash point. Referring to FIGS. 6 through 11, the structure of comparative material 3 is shown. The magnification is 1000 for the SEM and EPMA.

Figure 6:
FIG. 6 is photograph showing an SEM image of the cross section of lining, which is annealed at 180° C. for 100 hours, and, then the overlay is shaved from a lining.
Figure 7:
FIG. 7 is a photograph showing an EPMA image of In of the lining described with reference FIG. 6.

As is apparent from FIGS. 6 and 7, the metal phase, which fills the clearances of skeleton, includes In at an extreme surperficial (approximately 10 μm deep) part thereof. As is apparent from FIGS. 8 and 9, the In distribution is the same as the configuration of clearances of skeleton. This indicates that In diffuses into the clearances of skeleton. As is apparent from FIGS. 10 and 11, In dissolve in the clearances of skeleton together with Pb present in the clearances.

These drawings indicate that the corrosion proceeds, while In and Pb in the clearances of skeleton dissolve.

Referring to FIGS. 12 and 13, In is present in the sintered alloy according to an example of the present invention until a depth of 300 μm or more and the distribution of In is almost the same as configuration of clearances of skeleton. From the comparison of FIGS. 12 and 13 with FIGS. 14 through 17, it is clear that Pb and In are present, even after the corrosion test, in the clearances of skeleton of surface part of bearing.

Figure 18:
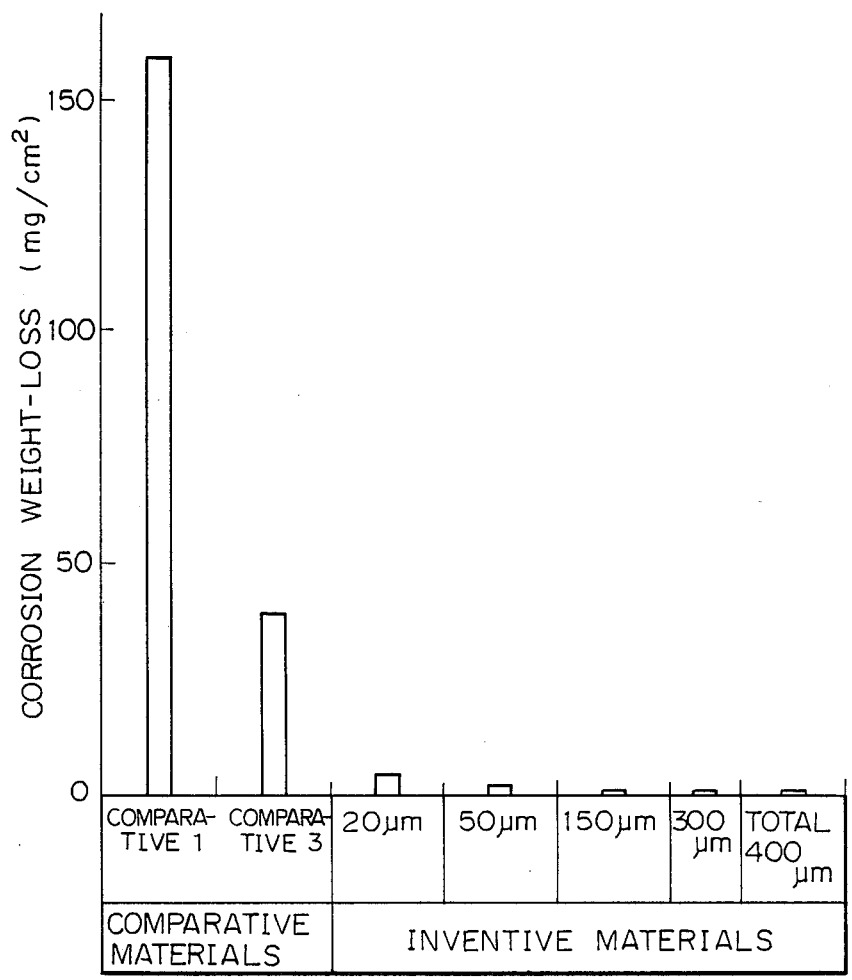
FIG. 18 is a graph showing a relationship between the inclusion depth of In and corrosion weight-loss.

The comparative materials 1 and 3, and the inventive materials referred in FIG. 18 were prepared by the same methods as described above for the corrosion test. A test was carried out to investigate the relationships between the In inclusion depth and corrosion. The treating time was controlled for the inventive materials to provide the In inclusion depth of 20, 50, 300, and 400 μm. At the inclusion depth of 400 μm, In arrived at the base plate. The In concentration in the Pb-containing phase was 8%. The In inclusioned depth was approximately 10 μm at the greatest in the comparative example 3. As is apparent from the results of FIG. 18, high corrosion resistance is obtained at the In-inclusion depth of 20 μm or more, preferably 50 μm or more, and more preferably 150 μm or more.

B. Seizure resistance test (1) The test materials The test materials as prepared and the test materials heated in degraded oil under the same conditions as the corrosion were tested.

(a) The inventive test materials The kelmet which is treated with In by the same method as the test materials for corrosion-resistance test.
(b) Conventional test material The same test materials as those for corrosion-resistance test.

(2) The testing conditions

Tester: Ultra-high pressure tester
Kind of Oil: 15W-40
Temperature of Oil: 110° C. (controlled in the bath)
Load: progressive increased
Rotation number: 1300 rpm
Shaft: hardened S55C (Hv500-600) roughness 0.8-1.0 μm Rz The results of test were as follows.

TABLE 1

| Test Materials | Seizure Load (kg/cm$^2$) |
| --- | --- |
| Conventional (before corrosion) | 600 |
| Conventional (after corrosion) | 100-200 |
| Inventive (before corrosion) | 850 |
| Inventive (after corrosion) | 800 |

The conventional material exhibits a high seizure load at the initial using period (before corrosion), but its seizure resistance is lowered extremely after long time use (after corrosion). The reduction in seizure load is due to disappearance or dissolution of Pb in the degraded oil. Contrary to this, the reduction in seizure resistance virtually does not occur after exposure under corrosive environments.

C. Corrosion-speed test (1) Test materials (a) the inventive test materials In-treated kelmet: the In concentration of the Pb-containing phase was varied at 1.5, 2 and 5%.

(b) Conventional test materials: the comparative test materials 1 and 3 subjected to the corrosion test. The In concentration was 0% in the comparative test material 1. In was present only on the outermost surface of the comparative material 3.

(2) The test was carried out in the degraded oil under the same conditions as the corrosion test for 800 hours.

Figure 19:
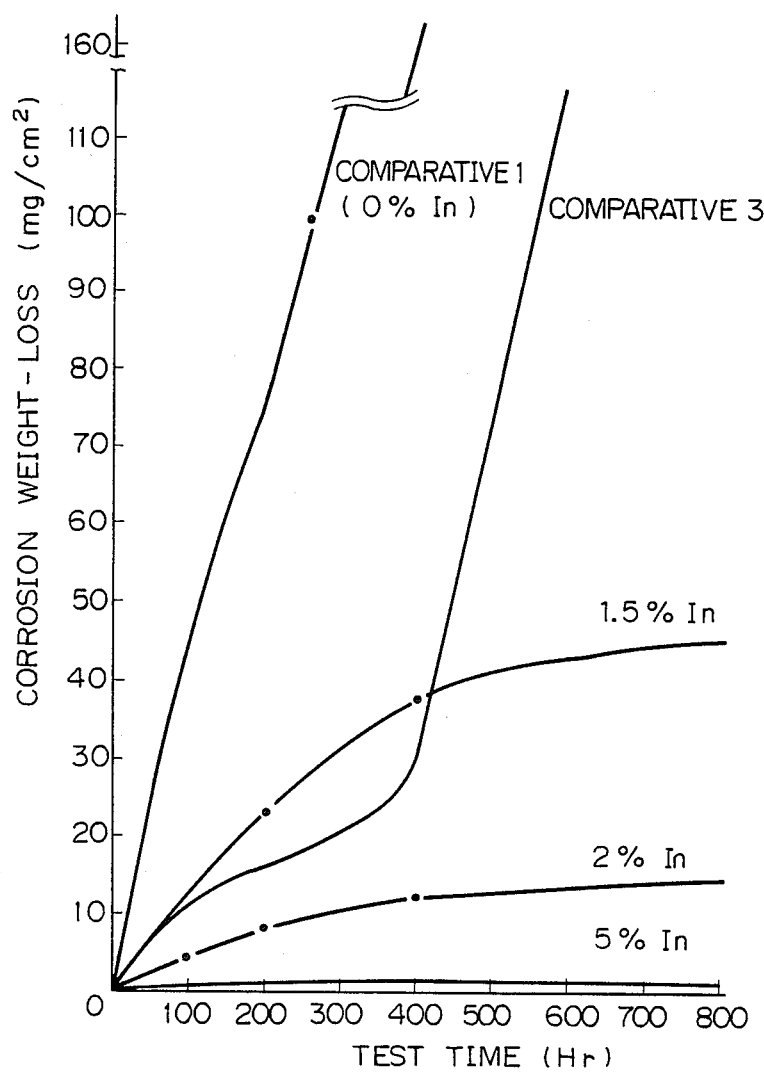
FIG. 19 is a graph showing the corrosion speed.

The results are shown in FIG. 19. As is apparent from the graphs of this drawing, the corrosion speed is drastically decreased due to inclusion of In into Pb-containing phase. Since the engine oil degrades after use of long period of time, the corrosion by degraded oil occurs after long period of time. The curvd of comparative material 3 shows an abrupt rise at the test time of 400 hours. This tendency of comparative material 3 suggests that the corrosion of this material in degraded oil is serious.

D. Gradient inclusion of In

A test material C-2 having gradient inclusion was prepared. That is, the In concentration had such gradient that it is 3.5% at the outermost surface and is 0% at the boundary with metal substrate (400 μm deep from the surface). The inclusion depth was 10 μm. This sample was prepared by a short dip time in the Pb-In bath. For the comparison purpose a test material C-1 free of In was prepared.

The corrosion test A was carried out.

The results are shown in Table 2.

TABLE 2

| Test Materials | In (%) | Corrosion Weight Loss (mg/cm$^2$) | Corrosion Appearance |
| --- | --- | --- | --- |
| C-1 | 0 | 160 | x |
| C-2 | 0 (interior) 3.5 (surface) | 26 | Δ x |

Remarks:
x - almost all of Pb is dissolved
Δ x - Pb phase is dissolved up to a considerable depth.

The In-inclusion at depth of 10 μm can lessen the corrosion weight loss (C-2). However, when the surface of test material C-2 was observed after corrosion, it turned out that the Pb phase corroded at a very deep part thereof.

The inventive features are set forth in claim 1 based on the results shown in FIGS. 3 through 19 and Tables 1 and 2.

Preferred features are set forth in the dependent claims because of the following reasons.

The additional quantity of In is preferably from 0.5 to 40% based on the Pb-containing phase. When the additional quantity is less than 0.5%, the corrosion resistance of Pb-containing phase is not enhanced satisfactorily. On the other hand, when the additional quantity of In exceeds 40%, In and Cu form an alloy, with the result that the proportion of In included in the Pb becomes small. The additional quantity of In is more preferably 30% or less, since the Pb-containing phase is liable to soften at the quantity exceeding 30%. In improves the conformability in addition to the above described corrosion resistance. Since In is very expensive, its additional quantity should be determined taking into consideration of costs. Preferred additional quantity of In in the light of performances and costs of bearing is from 2 to 30%, particularly 5 to 10%.

At least one element selected from the group consisting of Sb, Ca, Bi, and T1 can be added to the Pb-containing phase, besides the addition of In. Such at least one element having the effect of improving the lubricating property and conformability of the bearing. Sb and Ca have the further effect of preventing such phenomenon that the In in the Pb-containing phase moves under heat toward the surface of the skeleton and is secularly bonded with the Cu alloy at such surface, thereby decreasing the In concentration of Pb-containing phase. Sb and Ca are therefore effective for suppressing the movement of In in Pb-containing phase and hence reduction in corrosion resistance of Pb-containing phase. Preferred additional quantity of Sb, T1 and Bi is 10% or less in a case of adding each element alone and 20% or less of the sum of elements in a case of adding two or more elements. Preferred additional quantity of Ca is 2% or less, particularly 1% or less. At quantity exceeding the above upper limits, the performances of bearing may be influences disadvantageously. These additive elements are added into the Pb-In bath and are impregnated, together with In, into the bimetal strip. The inclusion depth of Sb and the like is preferably 20 m or more from the surface of bearing layer.

In the production of bearing according to the present invention, it is advantageous in the light of production cost and quality to convey a bimetal strip through the Pb-In bath by the following methods for intruding In into the Pb-containing phase.

(1) Cu alloy free of Pb is sintered on a steel sheet to form a bimetal having a skeleton structure with vacant spaces. The bimetal is then immersed in the Pb-In bath.

(2) Cu alloy containing Pb is sintered on a steel sheet to form a bimetal having a skeleton structure with Pb-filled spaces. The bimetal is then immersed in the Pb-In bath so as to partly replace Pb of bimetal with In.

(3) Cu-Pb alloy is cast on a steel sheet. The steel sheet is then immersed in the Pb-In bath to replace partly Pb of cast alloy with In.

The most advantageous method is (2). The In concentration of Pb-In bath should be made approximately equal to or slightly higher than the target In concentration of Pb-containing phase. The In concentration of Pb-containing phase is dependent upon the In concentration of Pb-In bath.

The In inclusion ocurring in an example of dip method is described with reference to FIGS. 1A through 1D.

Referring to FIG. 1A, the cross sectional structure of bimetal is illustrated. Reference numerals denote the following parts of bimetal: 10-metal subtrate: 11-Cu phase of Cu-alloy skeleton; 12-Pb-containing phase; and, 13-surface. The bimetal is dipped in Pb-In bath at temperature of 350° C. for 3 to 10 minutes. In permeates, as shown by dots in FIG. 1(B), into the Pb-containing phase 12(region B), while Pb is replaced with In or In intrudes into the pores by capillary action. The region B has depth of 200-300 μm. In is not added to the side of Pb-containing phase 12 the Pb-In alloy 14 having the same composition as the Pb-In bath is deposited. The wiping device 22 (FIG. 3) is preferably installed above the bath to wipe the Pb-In alloy 14.

Figure 1C:
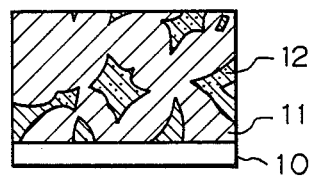
Figure 1D:
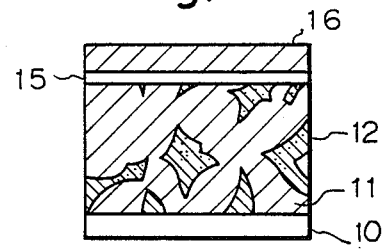
Figure 2:
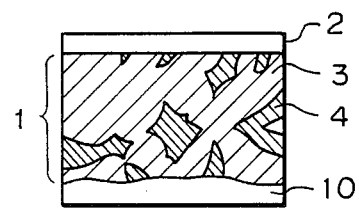
FIG. 2 is a cross sectional view of major part of kelmet bearing.

The lining is then subjected to broaching or boring to remove it by approximately 100 μm from the top surface thereof, as shown in FIG. 1C. The Pb-containing phase 12, in which In is included, is left at least approximately 20 μm in depth. Alternatively, only the Pb-In alloy 14 may be removed. An Ni barrier 15 with or without overlay may be deposited. An overlay 16 may be deposited on the Ni barrier or lining. The Ni barrier 15 and overlay 16 are unnecessary for the bearing used under a low load.

As is described above, the corrosion resistance against degraded oil is enhanced by the present invention.

Furthermore, the mechanical strength is high even after running for a long distance, because the spaces between the skeleton are filled with metal. The seizure resistance is high, since the In is present in the lining until a considerable depth. The bearing according to the present invention exhibits excellent load capacity, seizure resistance and fatigue resistance, when it is used for a long period of time. Example In was permeated into the following samples by a depth of more than 300 μm. The samples were tested by the same method as is described with Table 2. the results are shown in Table 3.

TABLE 3

| Nos. | In (%) | Corrosion amount (mg/cm$^2$) | Corrosion Appearance |
|---|---|---|---|
| 1 | 0.5 | 107 | Δ x |
| 2 | 1.0 | 74 | Δ x |
| 3 | 1.5 | 38 | Δ |
| 4 | 2.0 | 12 | O |
| 5 | 2.5 | 5 | O |
| 6 | 3.0 | 3 | O |
| 7 | 4.0 | 2 | O |
| 8 | 5.0 | 1 | ◎ |
| 9 | 6.0 | 0.5 | ◎ |

TABLE 3-continued

| Nos. | In (%) | Corrosion amount (mg/cm$^2$) | Corrosion Appearance |
|---|---|---|---|
| 10 | 7.0 | 0.5 | ◎ |
| 11 | 8.0 | 0.3 | ◎ |
| 12 | 9.0 | 0.3 | ◎ |
| 13 | 10.0 | 0.5 | ◎ |
| 14 | 15.0 | 1 | ◎ |
| 15 | 20.0 | 1 | ◎ |
| 16 | 30.0 | 1 | ◎ |
| 17 | 40.0 | 1 | ◎ |

Remarks
Δ x: Corrosion of Pb phase up to a considerable depth
Δ: Corrosion of Pb phase only at a part of the surface
O: Slight corrosion of Pb phase
◎: Virtually no corrosion of Pb phase

We claim:

1. A bearing having an improved corrosion resistance, comprising:
a base plate; and,
a bearing layer of Cu-series alloy which has the first surface facing said base plate and the second surface opposite to the second surface and which consists essentially of a Cu-alloy phase forming a skeleton structure extending between said first surface and second surface and a Pb-containing phase filling essentially clearances of the skeleton structure, wherein at least a part of said Pb-containing phase including the second surface contains In until a depth exceeding approximately 20 μm measured from the second surface.

2. A bearing according to claim 1, wherein said Pb-containing phase consists of In and Pb, and the In content is from 0.5 to 40% based on the weight of PB-containing phase.

3. A bearing according to claim 1, wherein said Cu-alloy phase is from 50 to 86% based on the weight of the Cu-series alloy, balance being essentially the Pb-containing phase.

4. A bearing according to claim 1, 2 or 3, wherein said Cu-series alloy contains at least one member selected from the group consisting of: (a) 0.1-20% of Sn: (b) 5% or less of each of Ni, Sb, Al, Fe and Mn in the case of adding each of these elements, and 10% or less in sum of Ni, Sb, Al, Fe and Mn in the case of adding two or more of these elements; (c) 0.1-60% of Zn; and, (d) 0.01-0.5% of P.

5. A bearing according to claim 1, 2 or 3, wherein said In is contained in the Pb-containing phase from the second surface to the first surface.

6. A bearing according to claim 5, wherein the Pb-containing phase further contains at least one element selected from the group consisting of Sb, Ca, Bi, and T1.

7. A bearing according to claim 6, wherein said at least one element selected from the group consisting of Sb, Ca, Bi, and T1 is contained until a depth of at least approximately 20 μm from said second surface.

8. A bearing according to claim 7, wherein the content of said at least one element selected from the group consisting of Sb, Bi, and T1 is 10% or less in the case of adding each element and 20% or less for sum in the case of adding two or more elements selected from the group consisting of Sb, Bi, and T1, and, further, the content of Ca is 2% or less.

9. A bearing according to claim 1, 2, or 3, further comprising an overlay on the second surface of the bearing layer.

10. A bearing according to claim 9, further comprising an Ni barrier between the overlay and the second surface of the bearing layer.

11. A bearing according to claim 1, 2 or 3, wherein said bearing layer is a sintered alloy layer.

* * * * *